United States Patent [19]

Williams et al.

[11] Patent Number: 4,896,074

[45] Date of Patent: Jan. 23, 1990

[54] PROCESS FOR MARKING A GLASS OBJECT AND ARTICLE

[75] Inventors: Debra L. Williams, Hillsboro; David S. Holmes, Stoddard; Daniel D. Devir, Sutton, all of N.H.

[73] Assignee: GTE Products Corporation, Danvers, Mass.

[21] Appl. No.: 289,843

[22] Filed: Dec. 27, 1988

[51] Int. Cl.$^4$ .......................... H01J 9/24; H01K 1/28
[52] U.S. Cl. .................................... 313/635; 313/272;
   445/12; 65/138; 106/19; 106/286.4; 427/106;
   427/126.3; 428/34.4
[58] Field of Search ....................... 313/635, 272, 578;
   445/12; 65/138; 106/19, 286.4; 427/106, 126.3;
   428/34.4

[56] References Cited

U.S. PATENT DOCUMENTS 4,766,339  8/1988  Berry et al. ..................... 313/273 X Primary Examiner—Kenneth Wieder
Attorney, Agent, or Firm—William E. Meyer

[57] ABSTRACT

A process of manufacture and an article produced by the process in the form of a lead glass substrate. The substrate is discretely marked during the manufacturing process by directing a flame upon it that is deficient in oxygen to provide a darkened or black marking in the glass surface. The invention is especially useful for marking electric lamps.

18 Claims, 2 Drawing Sheets

PROCESS FOR MARKING A GLASS OBJECT AND ARTICLE

BACKGROUND OF THE INVENTION

1. Technical Field

The present invention relates to a method of marking glass articles, and more particularly to the method of marking a glass component of a lamp during the process of its manufacture to provide a discrete mark on the lamp for identification purposes.

2. Background Art

In the field of manufacturing glass articles, and in particular in the manufacture of electric lamps, there is often a need to provide a marking which will allow tracing the particular item to a source of manufacture, or in the case of a glass lamp which has been manufactured by automatic machinery, to a particular machine employed in its manufacture. In this situation, where it is necessary to mark a glass object such as a glass lamp envelope, it is often difficult to do so due to the size of the object, its particular shape, and the fragile nature of the material used. Also in many instances, the extra step of marking the item would add increased time to production and increased cost to the manufacture of the item. Heretofore, there have been various common methods employed for such product identification, such as the use of ink, stamps, embossing, or colored glasses and labels. While all of these methods of identification have proven to be successful for various applications, they all require that physical items be added to the product or an additional step be provided in the manufacturing process. It is therefore an object of the present invention to provide a marking to a lead containing glass article, which marking is nearly permanent and is highly variable in application as to size, position, and shape.

A further object of the invention is to provide a marking to lead containing glass articles which may be produced during the manufacturing process of the item without the provision of extra tooling and which will produce no mechanical damage to the item.

A further object of the invention is to provide a process for marking lead containing glass articles which is reliable, inexpensive and may be incorporated into a process normally employed in the manufacture of the glass article without the addition of process steps or machinery.

DISCLOSURE OF THE INVENTION

The aforementioned objects, and other objects which will become apparent as the description proceeds, are accomplished by providing a lead glass article with a discrete marking located thereon and a process for providing the marking on the article during its manufacture. During the manufacture of the article, a portion of the flame that is used in the manufacture or a separately directed flame is starved of oxygen adjacent that portion of the glass on which the particular marking is desired. As a result, the oxygen which is necessary for complete combustion of the gas is scavenged from the glass, leaving the glass surface slightly depleted of oxygen. With lead containing glass, the oxygen depletion results in a black mark on the glass surface and by selectively positioning, or shaping the black mark, the glass object can be identified as coming from a particular machine, factory, manufacturer, or as having been made at a particular time.

The present invention especially involves a method of manufacturing a lamp that uses a lead glass blank as one of the components. The component may be a lamp envelope or a bridge to hold the filament supports in the lamp. In either case, the lead glass is heated by a gas flame which is directed on the glass. The glass can be either hard glass or soft glass provided that there is lead in the composition. The glass is softened by the flame and in one embodiment the flame or a portion of the flame is maintained in a non-stoichiometric balance, that is lacking sufficient oxygen for complete combustion. The area, or points at which the flame contacts the glass to cause a blackening can be controlled to form a discrete marking or indicia on the glass, the marking or indicia having a discernable shape.

As an alternative or as an additional marking on the glass blank or on another glass structure within the lamp, a flame or series of flames may be applied during the heating of the glass to the strain point or at any of the annealing stages, or at a separate heating station during the manufacturing process of the electric lamp.

An article thus produced is identifiable by a darkened or blackened area in the lead glass structure of the product which may be an electric lamp or other article of manufacture.

BRIEF DESCRIPTION OF THE DRAWING

The foregoing and other features of the invention will be more particularly described in connection with the preferred embodiment, and with reference to the accompanying drawing, wherein.

BEST MODE FOR CARRYING OUT THE INVENTION

Figure 1:
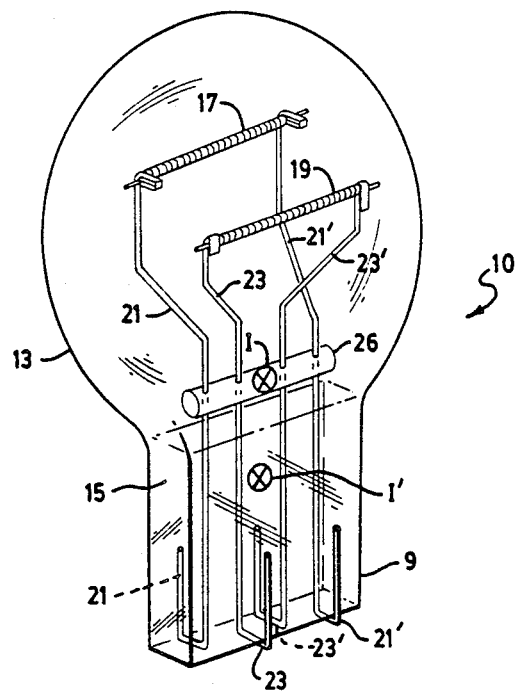
FIG. 1 is a schematic elevational view showing a lamp with a dual filament mount disposed within the envelope.
Figure 2:
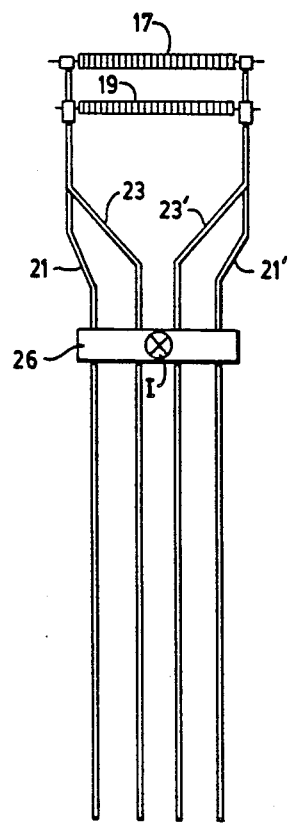
FIG. 2 is a side elevational view of a filament mount for the dual filament lamp shown in FIG. 1. The indicia provided in accordance with this invention is disposed upon a glass bridge that holds the filament mount together.

For a better understanding of the present invention together with other and further objects, advantages and capabilities thereof, reference is made to the following specification and appended claims in connection with the above described drawings.

With particular attention to the drawings, there is illustrated an electric lamp 10 which is particularly adapted for use as part of a tail light assembly in an automobile. It will be understood, however, that the invention described herein has many further uses wherein it is desirable to identify the machine that made the device that has included in its construction the glass marked according to the principals of the present invention. Lamp 10 includes a light transmitting envelope in the form of a glass, for example lead glass, bulb 13. The bulb 13 contains a rare gas such as argon established at approximately atmospheric pressure. Bulb 13 is press or pinch sealed at one end thereof using a pressing operation known in the lamp industry. When the glass is in the softened state, conventionally with incandescent lamps, a pair of clamps (not shown) are applied to opposite sides to the lower end of the envelope 10 and the flat pinch or press seal 9 is formed which retains the filaments and a filament supporting structure. As a result of the pressing operation, the flattened sealed end portion 9 is formed as a part of the lamp 10 adjacent the bulbous part of the envelope.

Pinch or press seal 9 is of substantially rectangular configuration when viewed in cross-section therethrough, in comparison to the bulbous shape of bulb 13 which may be either substantially cylindrical (tubular) or spherical (round) in shape.

Located within the bulb 13 is a pair of filaments 17 and 19, each of which is electrically connected to and secured by a corresponding pair of lead-in conductors which are hermetically sealed within the end portion 9 of bulb 13 and project exteriorly thereof. The opposing ends of each pair extend within the interior of bulb 13 and may be bent as indicated to ensure the desired position for both filaments. With particular attention to the drawings, filament 17 is connected and energized by lead-in conductors 21 and 21' while filament 19 is connected by lead-in conductors 23 and 23'. In this embodiment, a total of four conductors thus project exteriorly from the sealed end portion 9. The two filaments and the four lead-in conductors are spaced from each other by a bridge 26 which in an embodiment can be formed of a glass containing lead. In an embodiment of the present invention, an indicia "I" can be formed on the bridge 26. In another embodiment of the invention, the indicia "I'" can be formed on the exterior of the lamp, for example, on the press seal.

The press sealing of the envelope 10 is conducted with a flame which generally has a stoichiometric balance, that is to say the quantitative portions of gases including the oxygen content of the flame producing gas are balanced such as to induce optimum heating of the glass and complete combustion of the gas. Gases commonly used for such burning are commercial city gas, propane, methane, hydrogen or other similar combustible substances. The flame that is used to form the indicia "I" on the bridge 26 or the indicia "I'" on the press seal 9, is adjusted so that it contains a non-stoichiometric balance of gases by depleting the flow of oxygen from the combustion of gases. The particular nozzle selected is of a configuration and is disposed at a location so as to impinge upon the bridge 26 or the press seal 9 in a predetermined location and to impart a predetermined shape or indicia. Usually, with hot glass, that is glass that is still hot from a press seal operation or glass which is still hot from being sealed about the wires of the mount, directing the flame on the glass to deplete the oxygen usually takes less than 0.5 seconds. The amount of reduction of oxygen depends upon the surface temperature of the glass and if the glass is already hot enough then only a slight percentage of oxygen reduction is necessary, frequently in the neighborhood of 1 to 2 percent. If, however, the flame has to heat the glass to softening and also do the marking, a depletion of up to 10 percent of oxygen may be required. Surface reduction of the lead appears to commence when the glass is at or slightly above its strain point so the relative temperatures are important.

When the indicia is formed by the application of the oxygen deficient flame, a discrete marking is left of a black translucent surface "I" or "I'" of the lamp. The translucent surface is formed of lead oxide which is deficient in oxygen. In effect, the marking of the indicia "I" or "I'" at any point is accomplished by heating the glass to around its softening point with the oxygen deficient flame. The volatile lead component of the glass when subjected to an oxygen deficient flame releases oxygen to satisfy the flames' need, and leaves the black translucent surface on the glass consisting of lead oxide deficient in oxygen.

One nozzle may be used to form the marking "I" at the bottom centerline of the pinch seal 9, but it should be understood that any of the flames used at the annealing stage could be provided in the oxygen starved condition, or a number of nozzles could be so located as to provide a marking similar to the marking "I" at other points along the lamp 10 in which an indicia is desired to provide information concerning the glass lamp product or the indicia could be placed on articles other then lamp structures, so long as they have lead in the glass composition.

While in FIG. 1, the indicia "I" or "I'" is shown on both the bridge 26 and the press seal 9, it is to be understood that the locations are merely exemplary of locations which may be used. These two locations are of primary value because in both cases, the glass had been subjected to elevated temperatures and an indicia forming flame can easily be played on them.

Further, while the employment of the invention in one of the heating stages during the manufacturing process of the glass article is considered to be the most efficient method of supplying the marking to the article employing the invention, it is to be understood that a situation may arise in which it is desirable that the invention be employed at a separate heating process, at which only the marking occurs. In this case, the invention is equally applicable in that it is merely necessary to provide a nozzle or nozzles similar to the nozzle described above at a location or locations along the glass article's surface and provides the non-stoichiometric balanced flame at one or more of the nozzles in order to produce the desired marking of the item.

While it is apparent that changes and modification can be made within the spirit and scope of the present invention, it is our intention, however, only to be limited by the appended claims.

As our invention, we claim:

1. A method of manufacturing a glass article having a discrete marking located thereon comprising the steps of:
   providing a blank of a lead-containing glass material to be formed into the article by heating;
   subjecting the blank to at least one heating step in which the heating is produced by a flame that includes a gaseous mixture of a combustible gas and oxygen, said flame being applied to a surface of the glass blank, the oxygen content of said gaseous flame being in non-stoichiometric proportions relative to the combustible gas in a distinct portion of the flame to produce an indicia on the blank in the form of a black translucent surface of a lead oxide deficient in oxygen.

2. A method of manufacturing a glass article as set forth in claim 1 wherein said the glass blank is at a temperature at or above its strain point when the oxygen-starved flame is directed on it.

3. A method of manufacturing a glass article as set forth in claim 1 wherein said heating step occurs during an annealing process of the glass article.

4. A method of manufacturing a glass article as set forth in claim 1 which further includes the step of forming said blank into an envelope of an electric lamp.

5. A method of marking a lead glass article for identification purposes comprising the steps of:

providing at least one nozzle means for flow of gas therethrough;

providing a flammable mixture of gas and oxygen through said nozzle means, said mixture being in non-stoichiometric proportions due to a reduced oxygen content;

igniting said gaseous mixture to produce a flame with a deficiency in oxygen and directing said flame only to a distinct portion of said lead glass article to heat said article and produce a black translucent surface forming an indicia in said distinct portion, said surface being a lead oxide deficient in oxygen.

6. The method of claim 5 wherein a plurality of additional nozzle means for flow of a gas mixture therethrough are provided, each nozzle means having a flow of stoichiometric gas mixture therethrough and each nozzle means being ignited and the flame produced thereby being directed to an area adjacent said distinct portion of said lead glass article simultaneously with the flame from said one nozzle means to thereby heat said article in the area adjacent said distinct portion.

7. A glass article of manufacture comprising:

a lead glass material, said article having a discrete marking located thereon in the form of a portion of said lead glass material which is comprised or a black translucent surface formed of a lead oxide deficient in oxygen.

8. A glass article as set forth in claim 7 wherein the black translucent surface is produced during the forming process of said article.

9. A glass article as set forth in claim 7 wherein said black translucent surface is produced by subjecting the glass material to a flame heating process.

10. A glass article as set forth in claim 7 wherein said black translucent surface is produced by subjecting the glass material to flame heating during an annealing process.

11. A glass article as set forth in claim 7 wherein said article comprises a glass envelope means for retaining a filament therein to form an electric lamp.

12. A glass envelope as set forth in claim 7 wherein said black translucent surface is produced by subjecting said surface to a non-stoichiometric gas flame of reduced oxygen content.

13. A glass article as set forth in claim 8 wherein said black translucent surface is produced by subjecting the glass material to a flame heating process.

14. A glass article as set forth in claim 13 wherein said flame heating process produces annealing of the glass material.

15. A glass article as set forth in claim 14 wherein said article comprises a glass envelope means for retaining a filament therein to form an electric lamp.

16. A glass article as set forth in claim 14 wherein said article comprises a glass bridge for retaining filament support wires of an electric lamp.

17. A glass article as set forth in claim 15 wherein said black translucent surface is produced by subjecting said surface to a non-stoichiometric gas flame of a reduced oxygen content sufficient to withdraw oxygen from the lead glass material.

18. A glass article as set forth in claim 16 wherein said black translucent surface is produced by subjecting said surface to a non-stoichiometric gas flame of a reduced oxygen content sufficient to withdraw oxygen from the lead glass material.

* * * * *